us008707329B2

(12) United States Patent
Cho et al.

(10) Patent No.: US 8,707,329 B2
(45) Date of Patent: Apr. 22, 2014

(54) OPEN FRAMEWORK SYSTEM FOR HETEROGENEOUS COMPUTING AND SERVICE INTEGRATION

(75) Inventors: Weduke Cho, Seongnam-si (KR);
Kyoochan Cho, Suwon-si (KR);
Soondong Kim, Suwon-si (KR);
Kwanjong Yoo, Suwon-si (KR)

(73) Assignee: Ajou University Industry Cooperation Foundation, Suwon-si (KR)

( * ) Notice: Subject to any disclaimer, the term of this patent is extended or adjusted under 35 U.S.C. 154(b) by 837 days.

(21) Appl. No.: 12/448,676

(22) PCT Filed: Jan. 5, 2007

(86) PCT No.: PCT/KR2007/000086
§ 371 (c)(1),
(2), (4) Date: Jun. 30, 2009

(87) PCT Pub. No.: WO2008/082021
PCT Pub. Date: Jul. 10, 2008

(65) Prior Publication Data
US 2010/0011374 A1 Jan. 14, 2010

(30) Foreign Application Priority Data
Jan. 5, 2007 (KR) .................. 10-2007-0001656

(51) Int. Cl.
*G06F 3/00* (2006.01)
*G06F 15/16* (2006.01)
*G06F 15/173* (2006.01)

(52) U.S. Cl.
USPC ............ 719/313; 719/315; 709/225; 709/206

(58) Field of Classification Search
None
See application file for complete search history.

(56) References Cited

U.S. PATENT DOCUMENTS

| 7,533,141 | B2 * | 5/2009 | Nadgir et al. ................. 719/313 |
| 2002/0156893 | A1 * | 10/2002 | Pouyoul et al. ............... 709/225 |
| 2004/0031038 | A1 * | 2/2004 | Hugly et al. .................. 719/315 |
| 2004/0078424 | A1 * | 4/2004 | Yairi et al. .................... 709/203 |
| 2004/0093580 | A1 * | 5/2004 | Carson et al. ................. 717/101 |
| 2005/0149935 | A1 * | 7/2005 | Benedetti ...................... 718/102 |
| 2006/0235986 | A1 * | 10/2006 | Kim .......................... 709/226 |
| 2007/0174454 | A1 * | 7/2007 | Mitchell et al. ............... 709/225 |
| 2008/0291908 | A1 * | 11/2008 | Bachmann et al. ............ 370/389 |

OTHER PUBLICATIONS

Manshan Lin et al., Goal Description Language for Semantic Web Service Automatic Composition, IEEE Computer Society, 2005, pp. 1-7.*
"Business-to-business interactions: issues and enabling technologies", Medjahed et al., 2003, pp. 1-27.*
"Beaweblogic platform: Introducing WebLogic Platform", 2003, pp. 1-30.*
"WS-CABroker: A Novel Web services-based Multimedia Content Alliance Broker Scheme", Jie Wu, 2005, pp. 1-5.*

* cited by examiner

*Primary Examiner* — Tuan Dao
(74) *Attorney, Agent, or Firm* — Stein IP, LLC

(57) ABSTRACT

An open framework system for both heterogeneous computing and service integration includes Wrappers both registering and administrating services by service having similar function, a framework transferring an execution result of a service to the applications after discovering the service through the Wrappers and invocating the service in case of receiving a message requesting the service from the applications, a message broker transferring messages between the applications and the framework, and an external module converting the protocols for meeting specification of the Wrapper for an existing service in an open framework system for both heterogeneous computing and service integration efficiently establishing USS (Ubiquitous Smart Space) by systematically integrating services of various protocols using in a plurality of applications under ubiquitous environment.

4 Claims, 3 Drawing Sheets

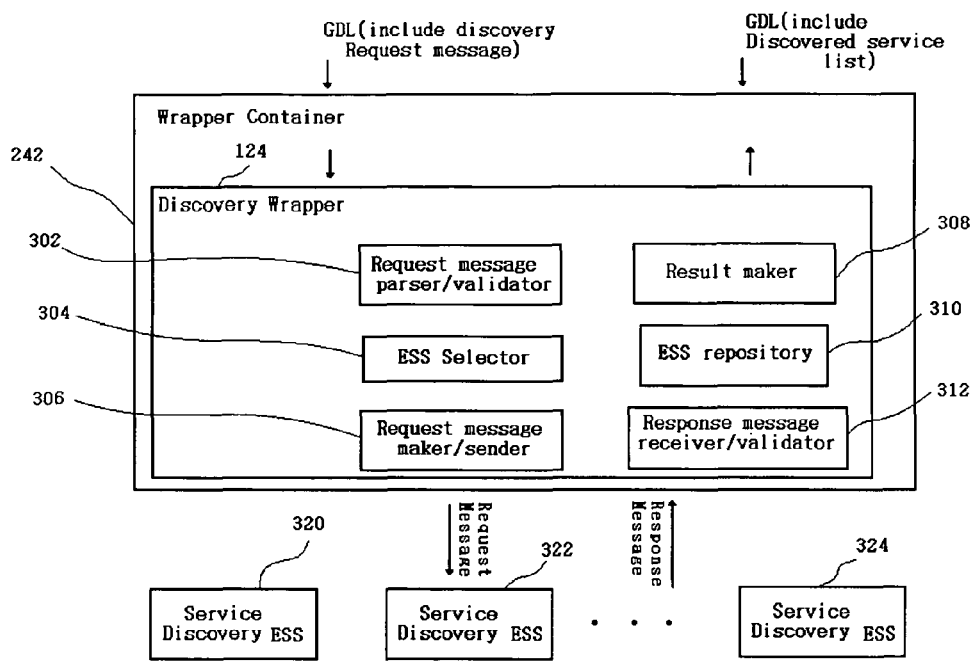
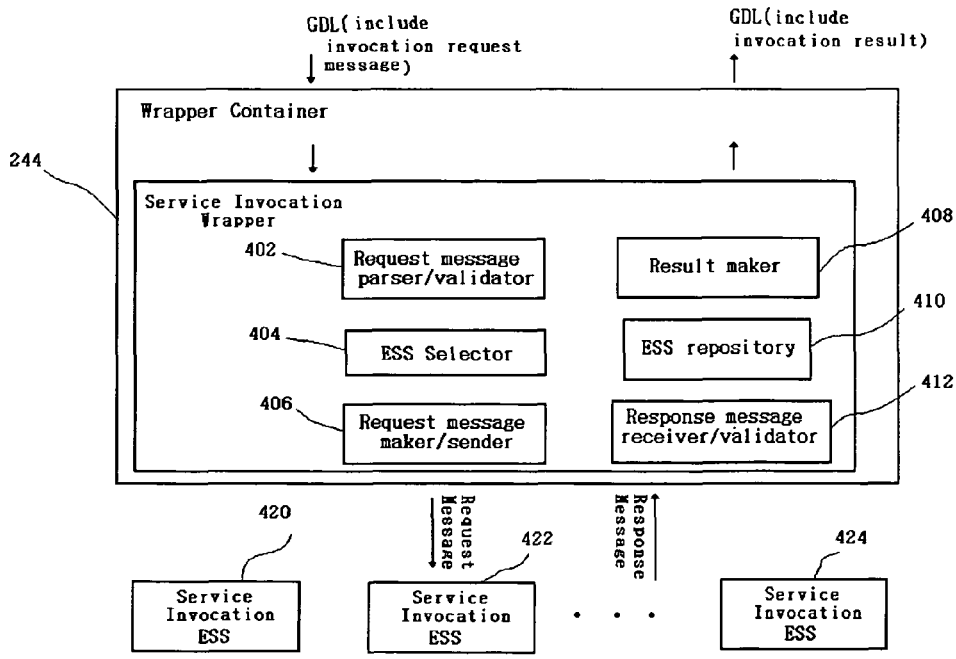

OPEN FRAMEWORK SYSTEM FOR HETEROGENEOUS COMPUTING AND SERVICE INTEGRATION

This is a National Phase Application filed under 35 USC 371 of International Application No. PCT/KR2007/000086, filed on Jan. 5, 2007, the entire content of which is hereby incorporated by reference in its entirety.

TECHNICAL FIELD

The present invention relates to ubiquitous system, more particularly, to an open framework system for both heterogeneous computing and service integration efficiently establishing USS(Ubiquitous Smart Space) by systematically integrating services of various protocols under ubiquitous computing environment.

BACKGROUND ART

Traditional computing environment is a static environment that users directly use a specific computing device in front of the space on which the specific computing device is putting. Ubiquitous environment is a dynamic and intelligent environment in which all computing devices existing in adjacent spaces cooperate each other for supporting the convenience and jobs of users, even though the users do not recognize the computing devices.

Various kinds of devices, applications on multiple platforms and services cooperate in real time, among themselves in the ubiquitous space generated due to combination of both physical and electronic spaces. These services existing in such an environment are mingled variously, and an information providing method must be decided and adjusted in execution time according to the subject with which a service is provided.

The system integration has difficulties under ubiquitous computing environment in that the computing environment is various and different computing environment, and both computing devices and services either get in or out of the ubiquitous environment dynamically. It has constraint to configure the conventional framework for requirement on high flexibility of such an ubiquitous environment, therefore, a new framework capable of integrating various services under ubiquitous computing environment is required.

DISCLOSURE OF INVENTION

Technical Solution

The technical task to achieve the present invention provides an open framework system for both heterogeneous computing and service integration for overall controlling devices using various protocols.

In order to achieve the technical task above, an open framework system for both heterogeneous computing and service integration according to the present invention may comprise a plurality of Wrappers both registering and administrating services by service having similar function, a framework transferring an execution result of a service to the applications after discovering the service through the Wrappers and invocating the service in case of receiving a message requesting the service from the applications, a message broker transferring messages between the applications and the framework, and an external module converting the protocols for meeting specification of the Wrapper for an existing service in an open framework system for both heterogeneous computing and service integration efficiently establishing USS (Ubiquitous Smart Space) by systematically integrating services of various protocols using in a plurality of applications under ubiquitous environment, the open framework system for both heterogeneous computing and service integration for overall controlling devices using various protocols.

The messages is expressed in GDL (Goal Description language) defined in the framework.

The framework may comprise a process flow engine scheduling both discovering and invocating the services requested by the applications, and a Wrapper administration unit invocating the Wrapper in response to an output signal of the process flow engine.

The Wrappers may comprise a service discovery Wrapper providing specification that all discovery services using the framework have to keep, a service invocation wrapper providing specification in which is able to execute services in integrating service execution frameworks mingled in the frameworks, and a context broker Wrapper providing specification to be kept for information exchange between the applications and the external module services.

The Wrappers are newly introduced in addition to the Wrappers established in the beginning.

Advantageous Effects

Since the application developed at the open framework system for both heterogeneous computing and service integration according to the present invention is self-existent for even changes of both service and environment, there is no need for the application to be amended in case that the services are further deleted or amended. Therefore, the life period of the application may be prolonged. Moreover, when the existing services and the services operating in middlewares, etc. are integrated with other middlewares etc., the existing services may be used as they are with minimal support by using the service-unified framework. Accordingly, even though respective domains are using different middleware or protocols among themselves in case of establishing a huge domain, the productivity will be much improved in easily integrating it by using the service-unified framework.

BRIEF DESCRIPTION OF THE DRAWINGS

The above and other features and advantages of the present invention will become more apparent by describing in detailed example embodiments thereof with reference to the accompanying figures, in which:

FIG. 3 is a block diagram illustrating the configuration of the Service Discovery Wrapper of FIG. 2.

FIG. 4 is a block diagram illustrating the configuration of the Service Invocation Wrapper of FIG. 2.

BEST MODE FOR CARRYING OUT THE INVENTION

In order to sufficiently understand the present invention, the benefits for the operations of the present invention, and the purpose of achievement for the embodiments of the present invention, it will be referred to the corresponding drawings and the contents of the corresponding drawings.

Preferable embodiments of the invention are described below with reference to the corresponding drawings. Throughout the drawings, reference numbers indicate identical elements, components, or steps.

The open framework system for heterogeneous computing and service integration according to the present invention may be based on a community computing of self-control collaboration computing, and be configured in an open typed platform by using an integrated architecture technology of various devices and services, etc. for the existing ubiquitous environment. The open framework system for heterogeneous computing and service integration according to the present invention is called to be USPi (Ubiquitous System platform Initiative) as an abbreviated term.

Figure 1:
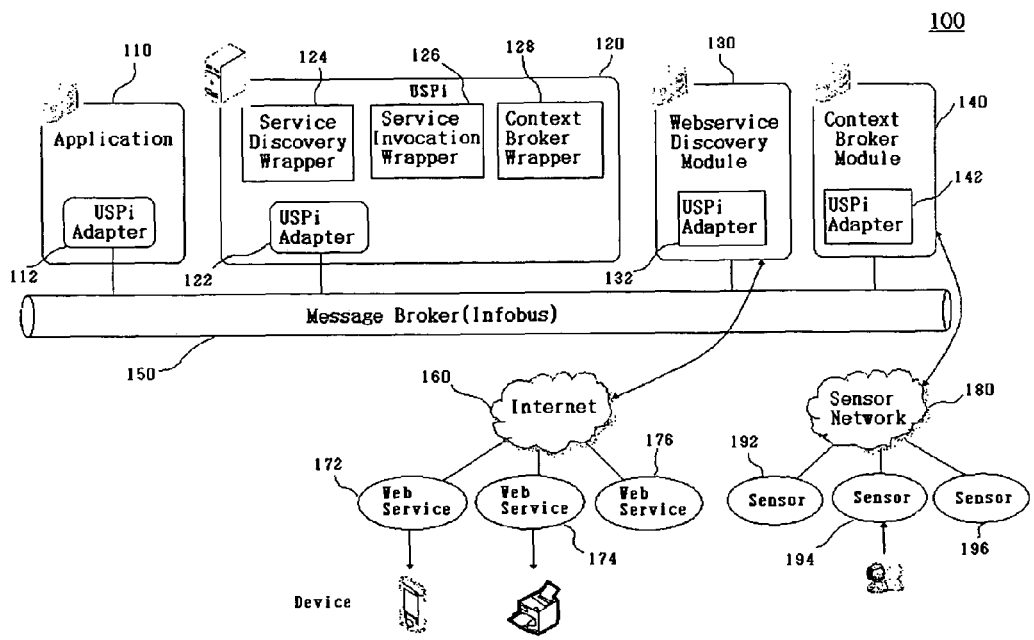
FIG. 1 is illustrated configuration of an open framework system for heterogeneous computing and service integration according to the present invention.

FIG. 1 is illustrated configuration of an open framework system for heterogeneous computing and service integration according to the present invention.

Referring to FIG. 1, a service integration framework system 100 may comprise an application 110, a service integration framework 120, a web-service searching module 130, a Context Broker Module 140, a message broker 150, web services 172, 174 and 176, and sensors 192, 194 and 196.

The application 110 may request a service to the service-unified framework 120, and receive an execution result thereof. Messages may be delivered between the application 110 and the service-unified framework 120 through the message broker 150. Since adapters are needed in order to deliver messages by using the message broker 150, the framework adapters 112, 122, 132 and 142 are used in the respective devices.

The service-unified framework 120 is a platform to unify application, service and various middlewares under a dynamic heterogeneous computing environment. Since the service-unified framework 120 comprises a Wrapper, an interface specification is possible to incorporate both functions and specifications of services performing similar functions.

The service-unified framework 120 may provide a Wrapper specification for the respective function blocks of a service system. External services should support such a Wrapper specification. In order to conform the Wrapper specification, an external module is provided, so that the existing service protocols may be converted and services may be provided to the service-unified framework. Moreover, the external module is constructed for supporting respective different middlewares and protocols; so, unifications among middlewares, among services and middlewares, and among protocols are all possible. In embodiment of the present invention, a web-service searching module 130 and a Context Broker Module 140 is provided as the external module.

The service-unified framework 120 may comprise a Service Discovery Wrapper 124, a Service Invocation Wrapper 126 and a Context Broker Wrapper 128.

The Service Discovery Wrapper 124 may provide the framework with function and suggest a standard specification in which all discovery services using the framework must keep. A specification is provided to service discoverers so that it may be unified in the service-unified framework. And, the previously developed services should be compatible by constructing a separate module incorporating specifications. Service searching is a function that accurately finds a service to be used. The service searching is an essential function for using the service-unified framework as well as the service invocation.

The Service Invocation Wrapper 126 is a wrapper performing service of the domain of the service-unified framework. The Service Invocation Wrapper 126 may provide specification performing services by unifying service execution frameworks mingled in the service-unified framework. By providing the specification, services to be developed thereafter may provide services to the service-unified framework without separate measures by constructing a service.

A Context Broker Wrapper 128 may suggest a standard specification to be kept in order to exchange information between the application 110 and the Context Broker Module 140. Context broker may be used by providing specification to the application 110 that is referring the context information.

The Context Broker is a service system providing various context information needed in a community. It is an essential function to provide a suitable service to context in the community, and may exist in various formats according to types and purposes of the context. The service unified framework may control a plurality of context brokers, and provide the Context Broker Wrapper to the application 110 requesting the context information in order to deliver information efficiently.

The Context Broker Module 140 may be configured to extract useful information for driving corresponding device, by monitoring various kinds of context in real time through a Sensor network 180, collecting data, analyzing in real time, and examining in real time, and be configured to control useful devices to users by self-recognizing context information (location, noise around, work, time and schedule, etc.) of the users changing at any time, such as CAS (Context-Aware Service), etc.

Figure 2:
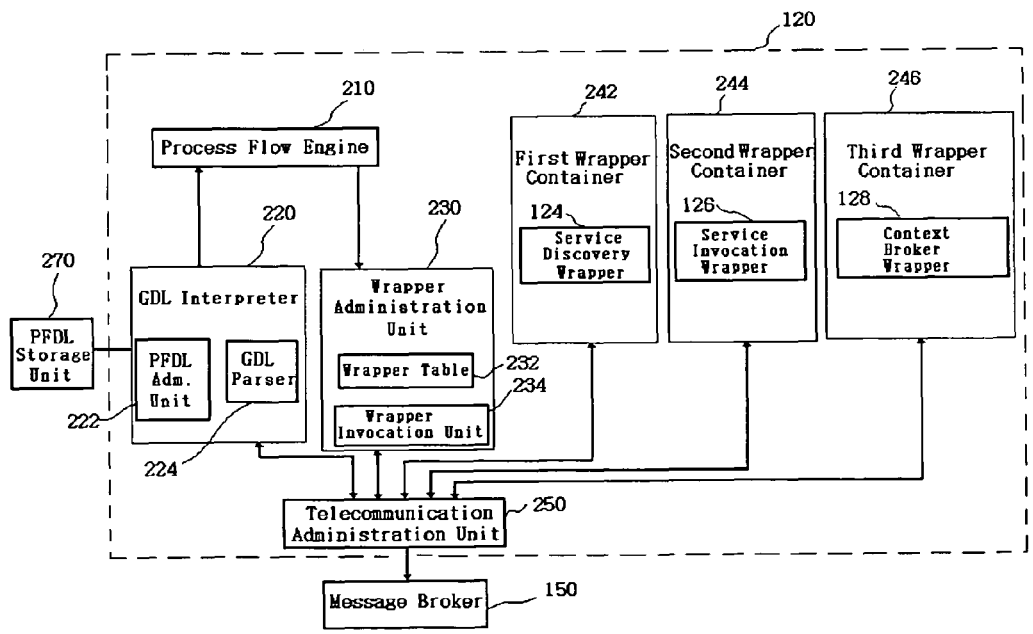
FIG. 2 is a block diagram illustrating the configuration of an open framework according to the present invention.

FIG. 2 is a block diagram illustrating the configuration of an open framework according to the present invention.

Referring to FIG. 2, the service-unified framework 120 may comprise a process flow engine 210, a GDL interpreter 220, a Wrapper administration unit 230, a first Wrapper container 242, a second Wrapper container 244, a third Wrapper container 246, and a telecommunication administration unit 250.

The process flow engine 210 may request services to the Wrapper administration unit 230 at every step of corresponding process flow. YAWL (Yet Another Workflow language) may be used to express process flow in the process flow engine 210. The YAWL is a strong workflow language complemented and improved the weak points of Petri Nets. The Petri Nets may have limits that do not support multiple instances, synchronized pattern and cancellation pattern. The YAWL according to the present invention, however, is a static based workflow language complemented the multiple instances, composite tasks, OR-joins, removal of tokens and directly connected transition, etc.

Since the YAWL supports all workflow patterns, it has a good expression, and has potential merit to be able to share process models written in other workflow languages. Therefore, the YAWL may be suitable in both extendably expressing and applying the process flow of the service-unified framework.

Symbols are shown to use at every node of the YAWL. A workflow may be visibly expressed by using the symbols. The YAWL may provide GUI (Graphic User Interface) editor to design the workflow and be able to do visual design by using it.

The GDL interpreter 220 may interpret GDL typed data to be inputted by the telecommunication administration unit 250 and then may select a suitable PFDL (Processflow Description Language) among the PFDL stored in a PFDL storage unit 270.

When the application 110 either requests services or receives corresponding results to/from the framework 120, data should be exchanged by using GDL technical language. The GDL is a language described a goal of the application, namely, Orchestration of services such as service searching, invocation or solution of a particular problem.

A GDL Parser 224 may interpret the GDL, and a PFDL administration unit 222 may select a suitable PFDL in the PFDL storage unit 270 storing before.

The Wrapper administration unit 230 may search and invocate respective wrappers for the services requested by the process flow engine 210. The Wrapper administration unit 230 may comprise a Wrapper table 232 both registering and controlling a plurality of wrappers, and a Wrapper invocation unit 234 charging the invocation of wrapper.

A plurality of Wrapper containers, 242, 244 and 246 may comprise a plurality of wrappers. The wrappers may both register and control services by service having similar function. In the embodiment illustrated, the first Wrapper container 242 may comprise the Service Discovery Wrapper 124, the second Wrapper container 244 may comprise the Service Invocation Wrapper 126, and the third Wrapper container 246 may comprise the Context Broker Wrapper 128. These wrappers may be further supplemented in addition to the basically established ones.

FIG. 3 is a block diagram illustrating the configuration of the Service Discovery Wrapper of FIG. 2.

The Service Discovery wrapper 124 (hereinafter 'SDW') may register services searching services to be installed in a domain of the service-unified framework. Several discovery services may exist in the service-unified framework, and it may be the SDW among them that integrates and controls services hoping registration in the service-unified framework. EM 320, 322 and 324 registered may be stored in a EM repository 310. Moreover, the SDW 124 may terminate the registration of the EM registered. The SDW may terminate the registration in the first place and the EM may request the termination.

A request message parser/validator 320 may interpret a discovery request message received and determines whether it is valid or not. The EM Selector 304 may select a EM with the service request information in case there are a plurality of EM registered. A Request message maker/sender may transmit the service request message to the EM selected by the EM Selector 304. After a Service Discovery EM 322 receives the request message, it may execute the service discovery and send a response message to the SDW 124. A response message receiving/verifying unit 312 may determine whether it is valid or not, after receiving the response message from the EM. A Result maker 308 may send service discovery result to the telecommunication administration unit 250.

The most important part in the SDW would be the definition of actual data format to be utilized for the use of service between the service-unified framework and the EM. The EM should process data to conform to a unified-schema format that the SDW provides, in order to do service discoveries that are developing, respectively and having merit/demerit. The data conforming to the unified-schema defined in the SDW is only possible for the data transferring to the EM from the SDW, and vice versa. The SDW is responsible to determine whether the data to be used is appropriate.

The GDL may have all kinds of schema including all messages used between the service unified-framework and the service discovery EM. A schema of body may be determined by the command of the GDL. Accordingly, the SDW should interpret both header and body of the GDL. The body may be defined as an arbitrary format, and the format of the body may be determined according to the instruction of the header. The schema of the body is defined according to instructions that are 6 types described in below. Respective instructions have their own message schemas.

The EM must be registered in the SDW in order to provide services in the service-unified framework, and SDWRegister is a message schema using at registering Discovery EM into the SDW.

SDWDeregister is a message in which deregisters the EM in the SDW. The message may be used when the SDW sends to the EM and the EM requests the deregistration.

SDWRequest is a message schema for requesting a discovery to the SDW.

SDWResponse is a message schema returning a discovered result in response to the SDWRequest.

SDWACK is a message schema for affirmative response for the message of the SDW. It may be possible in response to both the SDWRegister and SDWDeregister.

SDWNACK is a message schema for negative response for the message of the SDW. It may be possible in response to the SDWRegister, SDWDeregister, SDWRequest and SDWResponse.

FIG. 4 is a block diagram illustrating the configuration of the Service Invocation Wrapper of FIG. 2.

Service Invocation Wrapper (hereinafter 'SIW') 126 is a Wrapper performing service of domain in the service-unified framework. The SIW 126 may provide specification to execute services by integrating service execution frameworks mingled in the service-unified framework. By providing such a specification, services to be developed later may be provided in the service-unified framework by constructing a service supporting the corresponding specification, without any separate management. Therefore, the existing developed services may be connected to the service-unified framework by constructing the EM so that the integration may be achieved through minimum efforts.

There may be any information necessary for execution of service. For example, it may need lots of information such as either service name or URL, parameter for execution, values of the parameter, and either credit card number or address. For the information respective services are requiring, they are all different, and information necessary for performing a service may absolutely vary according to a service to be performed. It may be the essential function of the SIW that defines a general typed message schema illustrating both service execution unifying all situations and result thereof, executes the service by using the message schema, and gets its result back.

Request message parser/validator 402 may interpret a discovery request message received and determines whether it is valid or not. The EM Selector 404 may select one of the EM with the service request information, if a plurality of EM is existing. Request message maker/sender may transmit the service request message to the EM selected by the EM Selector 404. Service Invocation EM 422 may send a response message to the SIW 126 by executing the service, in case that it receives the request message. Response Message Receiver/Validator 412 may validate whether the response message is valid or not, after receiving the response message from the EM. Result maker 408 may transmit result of the service execution to the application 110 through the telecommunication administration unit 250.

The SIW 126 may communicate with Service Invocation EM 420, 422 and 424, while it exchanges messages with the application 110 through the service-unified framework 120.

The SIW 126 may communicate with the service-unified framework 120, the EM 420, 422 and 424, and all objects communicating with the SIW 126 by a homogeneous message format. It is defined as SIW message schema. Therefore, every object using the SIW must be developed to adhere to the SIW message schema.

The following message schema may be used in the SIW 126. There may not be any separate protocols, but messages may include everything.

The SIWRegister is a message using at when the service invocation EM registers itself in the SIW. In its response, the SIWACK and SIWNACK, etc. may be returned.

The SIWDeregister is a message used for deregister the service invocation EM registered. Message may be transferred to the EM from the SDW, and vice versa. In its response, the SIWACK and SIWNACK may come.

The SIWRequest is a message requesting invocation to the SIW.

The SIWRequest may generally be transferred to the SIW from the service-unified framework, and to the service invocation EM through the SIW, again. In its response, the SIWResponse and SIWNACK may come.

The SIWResponse is a message returning execution result of service in response to the SIWRequest. The SIWResponse may generally be transferred to the SIW from the service invocation EM, and to the service-unified framework through the SIW. The SIWNACK may return in case of error messages.

The SIWACK is used for affirmative response of both the SIWRegister and SIWDeregister.

The SIWNACK is used for negative response of all the SIWRRegister, SIWDeregister, SIWRequest and SIWResponse.

Figure 5:
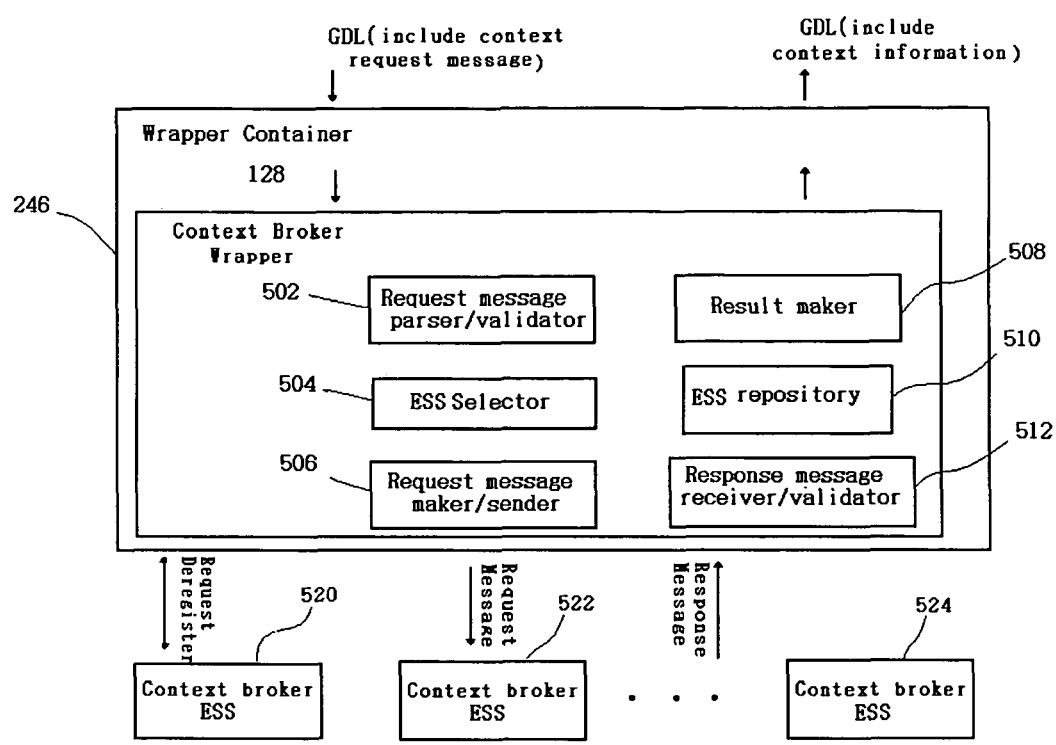
FIG. 5 is a block diagram illustrating the configuration of the Context Broker Wrapper of FIG. 2.

FIG. 5 is a block diagram illustrating the configuration of the Context Broker Wrapper of FIG. 2.

The Context Broker Wrapper (hereinafter 'CBW') 128 proposes a standard specification to be kept for information exchange between the application and a Context Broker. The CBW may provide the application using context information with the specification so that the application may use the Context Broker through the CBW 128.

Context Broker EM 520 may request a registration into a EM repository 510 to the CBW 128 by using CBW unified schema. The CBW 128 may register the Context Broker EM 520 in the EM repository 510, after determining whether the message requested is valid. Deregistration may be performed the same as the registration procedure.

The application 110 that wants context information requests a message to the service-unified framework 120, the service-unified framework 120 may deliver the message requested to the CBW 128. Request message parser/validator 502 may interpret the request message received and determines whether it is valid or not. The EM Selector 504 may select one EM with the service request information in case there are a plurality of EM registered. A Request message maker/sender may transmit the service request message to the EM selected by the EM Selector 504. After a Context Broker EM 522 receives the request message, it may send a response message including the Context information to the CBW 128. A response message receiving/verifying unit 512 may determine whether it is valid or not, after receiving the response message from the EM. A Result maker 508 may send the response message including the Context information to the application 110 through the telecommunication administration unit 250.

It is message schema in which the CBW is using. There exists 6 types of messages. As followings are the respective functions The EM must be registered in the CBW in order to provide services in the service-unified framework, and CBWRegister is a message schema using at registering Context Broker EM into the CBW.

CBWDeregister is a message used to deregister the EM in the CBW. The message may be used when the CBW sends to the EM and the EM requests the deregistration to the CBW.

CBWRequest is a message schema for requesting Context information to the CBW.

CBWResponse is a message schema returning the Context information in response to the CBWRequest.

CBWACK is a message schema for affirmative response for the message of the CBW. It may be possible in response to both the CBWRegister and CBWDeregister.

CBWNACK is a message schema for negative response for the message of the CBW. It may be possible in negative response to the CBWRegister, CBWDeregister, CBWRequest and CBWResponse.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention.

The invention claimed is:

1. An open framework system for both heterogeneous computing and service integration efficiently establishing USS (Ubiquitous Smart Space) by systematically integrating services of various protocols used in a plurality of applications under a ubiquitous environment, wherein the open framework system comprises:
   at least one computer processor;
   a framework comprising a plurality of Wrappers both registering and administrating services by service having similar function, executed by the computer processor, the framework transferring an execution result of a service to the applications after discovering the service through the Wrappers and invoking the service in case of receiving a message requesting the service from the applications, executed by the computer processor;
   a message broker transferring messages between the applications and the framework, executed by the computer processor; and
   an external module seeking and discovering an outside existing service before converting the protocols of the outside existing service to meet specification of the Wrapper, executed by the computer processor, the external module being external to the framework, the message broker, and the at least one computer processor, the outside existing service being outside the at least one computer processor, the framework, the message broker, and the external module,
   wherein the framework comprises: a process flow engine scheduling both discovering and invoking the services requested by the applications; and a Wrapper administration unit invoking the Wrappers in response to an output signal of the process flow engine.

2. The open framework system for both heterogeneous computing and service integration of claim 1, wherein the messages are expressed in GDL (Goal Description Language) defined in the framework.

3. The open framework system for both heterogeneous computing and service integration of claim 1, wherein the Wrappers comprise: a service discovery Wrapper providing specification that all discovery services using the framework have to keep; a service invocation Wrapper providing specification which is able to execute services in integrating service execution frameworks mingled in the frameworks; and a context broker Wrapper providing specification to be kept for information exchange between the applications and the external module services.

4. The open framework system for both heterogeneous computing and service integration of claim 1, wherein at least one Wrapper is newly introduced after at least one other Wrapper established in the beginning.

* * * * *